Figure 1:
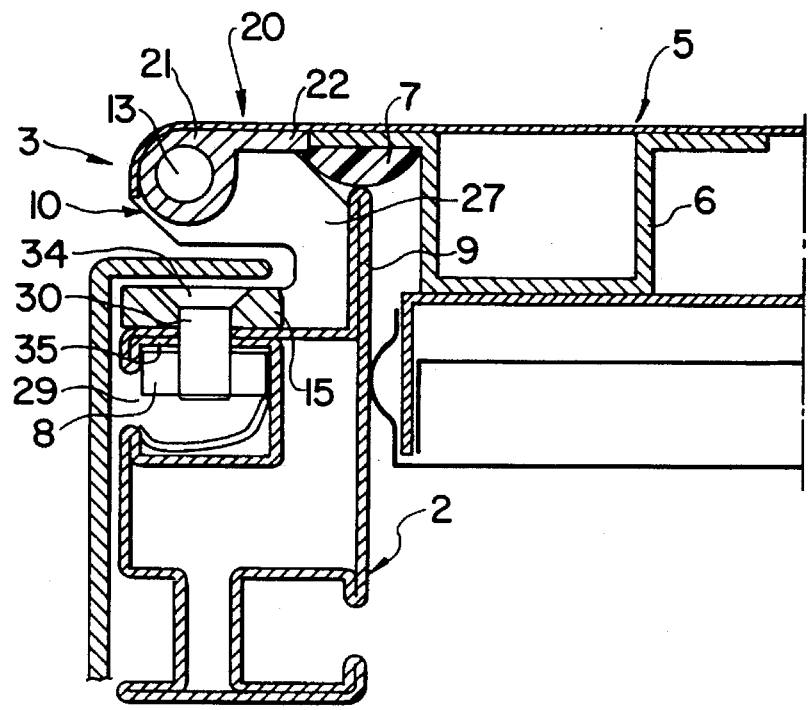

United States Patent [19]

Flamme

[11] Patent Number: 5,561,886
[45] Date of Patent: Oct. 8, 1996

[54] SEPARABLE HINGE

[75] Inventor: Hans Flamme, Unterhaching, Germany

[73] Assignee: Knürr-Mechanik für die Elektronik Aktiengesellschaft, München, Germany

[21] Appl. No.: 351,249
[22] PCT Filed: Jun. 9, 1993
[86] PCT No.: PCT/EP93/01472
    § 371 Date: Dec. 7, 1994
    § 102(e) Date: Dec. 7, 1994
[87] PCT Pub. No.: WO93/25790
    PCT Pub. Date: Dec. 23, 1993

[30] Foreign Application Priority Data

Jun. 10, 1992 [DE] Germany .......................... 92 07 804 U
Nov. 3, 1992 [DE] Germany .......................... 92 14 963 U

[51] Int. Cl.⁶ ................................................ E05D 7/10
[52] U.S. Cl. .............................. 16/265; 16/260; 16/262
[58] Field of Search ........................... 16/265, 266, 267, 16/268, 235, 243, 248, 260, 261, 262, 270, 271, 254, 256, 386, 387

[56] References Cited

U.S. PATENT DOCUMENTS

| 313,740 | 3/1885 | Jaques | 16/270 |
| 1,962,709 | 6/1934 | Case | 16/265 |
| 2,748,420 | 6/1956 | Clover | 16/265 |
| 3,021,555 | 2/1962 | Hogedal | 16/261 |
| 4,010,504 | 3/1977 | Griffin | 16/265 |
| 5,111,503 | 5/1992 | Takagi | 16/260 |

Primary Examiner—Chuck Y. Mah
Attorney, Agent, or Firm—Keck, Mahin & Cate

[57] ABSTRACT

The invention concerns a hinge, in particular a hinge for switch-cabinet and instrument-cabinet doors, the hinge comprising a part fitted to the door and a part fitted to the cabinet which engage with each other for rotational motion by means of at least one hinge pin. In order to ensure that the hinge parts can be separated and reassembled rapidly and simply, the invention calls for at least one hinge part (10, 40) to be designed in two elements, via a first and a second element (11, 12; 41, 42) and that the first and second element (11, 12; 41, 42) can be displaced relative to each other in the longitudinal direction to enable the other part (20; 50) to be inserted and withdrawn again.

18 Claims, 3 Drawing Sheets

SEPARABLE HINGE

The invention relates to a hinge, particularly a door hinge for switch and instrument cabinets, according to the preamble of claim 1.

EP 157,344 B1 discloses a door hinge having a first hinge part fixed to the inside of a cabinet door and having a bearing hole, as well as a second hinge part on the cabinet side. The cabinet-side hinge part has two bearing holes on a fastening plate, between which is located the door-side bearing hole and are connected by means of two hinge pins in each case insertable in a cabinet-side bearing hole.

In order to be able to remove a folding door, e.g. for assembly or maintenance work, it is necessary to release the hinge joint, whilst maintaining the hinge pins fixed. For this purpose the hinge pins have in each case two spaced locking grooves, in which can engage a stop spring fixed on each cabinet-side bearing hole, so that the hinge pins, relative to the door-side bearing hole or the door-side hinge part can be held in an uncoupling position and a coupling position. In addition, on each hinge pin is provided a ring groove and a projecting retaining section, in order to be able to remove the hinge pins counter to the spring tension with the aid of a suitable tool, e.g. a screwdriver. However, this requires certain skill, because the hinges are often located in an area of an angled edge of the cabinet door and are not readily accessible.

A further disadvantage of this known hinge is the relatively complicated construction of in particular the hinge pin provided with different ring and locking grooves and the resulting cost-intensive manufacture of the hinge.

The object of the invention is to provide a hinge, which has a particularly simple design and robust construction and which is preferably used for 19" cabinets, switch and instrument cabinets, in which a rapid and uncomplicated removal and joining together of the hinge parts is advantageous.

According to the invention this object is achieved through the characterizing features of claim 1. Advantageous, appropriate developments appear in the subclaims and the specific technical description.

The invention is based on the idea that a particularly easy assembly and disassembly of hinge parts, e.g. for fixing and releasing a door on a cabinet or cabinet frame is possible if at least one hinge part, namely a cabinet-side or door-side hinge part, optionally also both hinge parts comprise two portions, which can be fixed independently of one another and are axially adjustable relative to one another and therefore in principle in the vertical direction in a cabinet.

According to the invention a bipartite compartment-side or door-side hinge part comprises a first, e.g. lower and a second, e.g. upper hinge portion, between which in the fixed state as a corresponding hinge part is provided a door-side or cabinet-side hinge part and is pivotably mounted by means of at least one hinge pin.

In a first embodiment of the invention a one-piece, door-side hinge part has a hinge pin projecting axially over a hinge pin support and which engages in a bearing hole of an upper cabinet-side hinge portion and in a bearing hole of the lower, cabinet-side hinge portion.

Preference is given to a construction with in each case one hinge pin on the lower and upper cabinet-side hinge portion, the hinge pins preferably being received in fixed manner, e.g. being inserted with press fit in a sleeve-like receptable. The door-side hinge part then has an e.g. rolled-in or curled hinge hole and is pivotably held between the bipartite and appropriately homologously constructed cabinet-side hinge portions fixed by means of in each case one fastening area by means of their hinge pins.

In a particularly simple manner in in each case one fastening area of the lower and the upper cabinet-side hinge portion is provided an elongated hole with a complementary depression for receiving a countersunk screw in a virtually central manner. The depression for the countersunk screw is in each case located on the hinge pin-side end of the elongated hole.

During assembly there is initially a detachable fastening of the lower hinge portion, preferably on a vertical beam of a cabinet or a cabinet frame constructed as a hollow section.

Appropriately a countersunk screw cooperates with a lockable spring nut, which is held in a virtually square T-slot of the vertical section of the cabinet in rotation-prevented and longitudinally displaceable manner. On release, but not during the complete removal of the countersunk screw, corresponding to the size of the elongated hole it is possible to adjust each cabinet-side hinge portion away from the door-side hinge part, so that the hinge pins are disengaged from the hinge hole. The door can consequently be easily removed from the cabinet. During the assembly of the door initially the fastening of the lower hinge portion takes place in that the countersunk screw is screwed down in the associated depression. The door with its door-side hinge hole is then mounted on the lower hinge pin and subsequently the upper, cabinet-side hinge portion, which was held in a top position with the aid of the countersunk screw loosened in the elongated hole, is moved in the direction of the door-side hinge hole, so that the upper hinge pin also comes into engagement. For the retention of the countersunk screw it is advantageous to use a lockable spring nut. However, it is also appropriate to use sliding nuts and simple spring nuts, which are longitudinally displaceably held in a T-slot of the vertical hollow section.

Appropriately the vertical dimensions of the mounting flanges and in particular the elongated holes, as well as the hinge pin length and the axial dimension of the hinge hole of the door-side hinge part are matched to one another. It is advantageous if the travel between the upper and lower mounting flanges of the two cabinet-side hinge portions are roughly the same or smaller than the travel of the pin length insertable in the door-side hinge hole.

In a second embodiment of the hinge according to the invention there is a bipartite door-side hinge part, which has a first door-side hinge portion and a second door-side hinge portion homologous thereto. As a rule said first and second hinge portions are a lower and an upper door-side hinge portion. In the case of doors which can be swung up and down or also windows with horizontally positioned hinges, the first and second hinge portions can also be a right and left, door or window-side hinge portion. For simplification purposes reference is solely made hereinafter to an upper and a lower door-side hinge portion. In order to be able to rapidly and easily insert and detach a cabinet-side and in particular one-piece hinge part, the upper and lower door-side hinge portions are adjustable relative to one another, i.e. at least one door-side hinge portion is axially displaceably fixed.

As in the case of the first hinge construction, the axial adjustability is achieved by means of at least one elongated hole, which can be formed in a fastening area of the lower and/or upper, door-side hinge portion or also in the door.

The bipartite construction of the door-side hinge part is particularly advantageous, because it is possible to easily and rapidly carry out a change of the door stop, e.g. from a left to a right door stop. Another advantage is that the door stop change is possible with a construction of a bipartite, door-side hinge part, so that storage and assembly can be made more rational.

It is also appropriate that through the construction and arrangement of the bipartite, door-side hinge part and the cabinet-side hinge part an opening angle of 180° is ensured.

The door-side, bipartite hinge part is appropriately fixed to the outside front of the door. The elongated hole or holes are then preferably made in the door, so as to obtain a closed and esthetically pleasing outer surface of a hinge or door front. The length of the elongated hole is adapted to the necessary travel for releasing or inserting the cabinet-side hinge part. The preferably one-piece, cabinet-side hinge part with hinge pins projecting on either side of a hinge support, or with bearing holes for hinge pins on the upper and lower door-side hinge portion has in the closed state an almost cylindrical area between the door-side hinge portions, the hinge support of the cabinet-side hinge part being aligned with the outer contour of the door-side hinge portions.

It is particularly advantageous that as a result of the longitudinal displaceability of the upper and/or lower hinge portion it is possible to compensate manufacturing tolerances of the hinge portions or cabinet parts in situ at the time of assembly.

The vertical adjustability of at least one cabinet or door-side hinge part and preferably both cabinet or door-side hinge parts, can also be achieved with the aid of an elongated hole formed in the vertical hollow section of the cabinet, in that the counter-sunk screw guided in a normal bore of the mounting flange is securable and fixable with a lockable spring nut.

It is advantageous that the door and cabinet-side hinge parts constructed according to the invention have a particularly simple and robust construction and are e.g. made from cast iron.

The invention is described in greater detail hereinafter relative to the drawings, wherein show:

FIG. 1 diagrammatically a cross-section through a first embodiment of a door hinge according to the invention fixed to a vertical beam of a cabinet.

Figure 2:
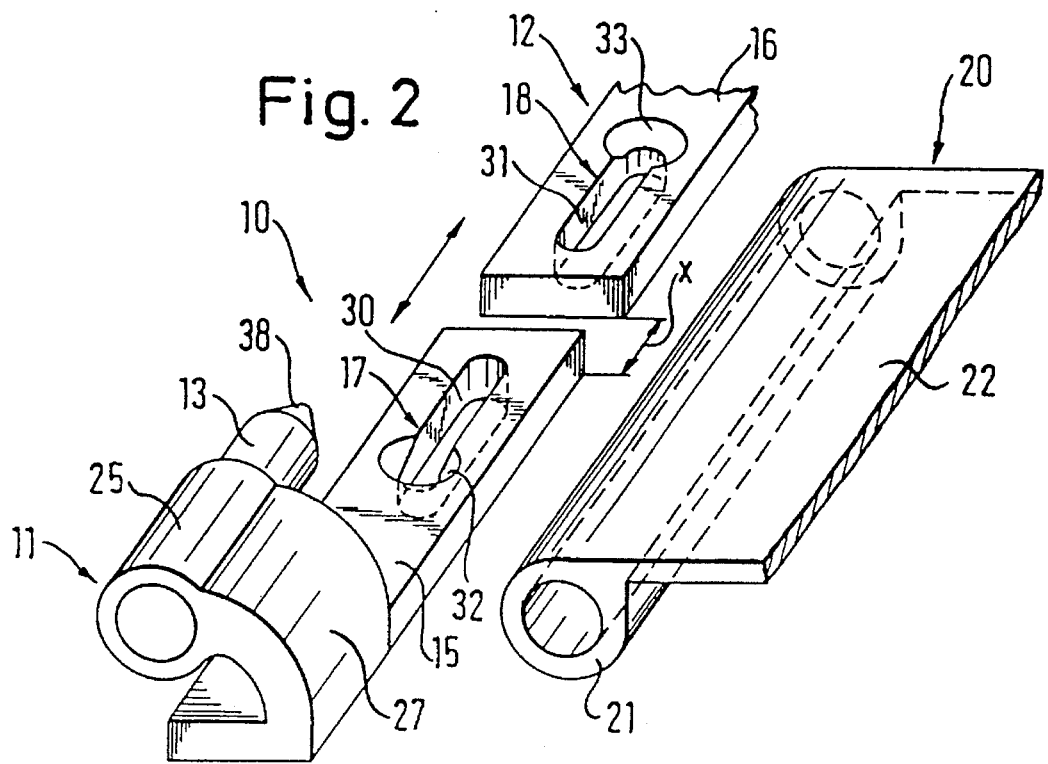

FIG. 2 a diagrammatic perspective view of a preferred construction of the first embodiment of the door hinge according to the invention.

Figure 3:
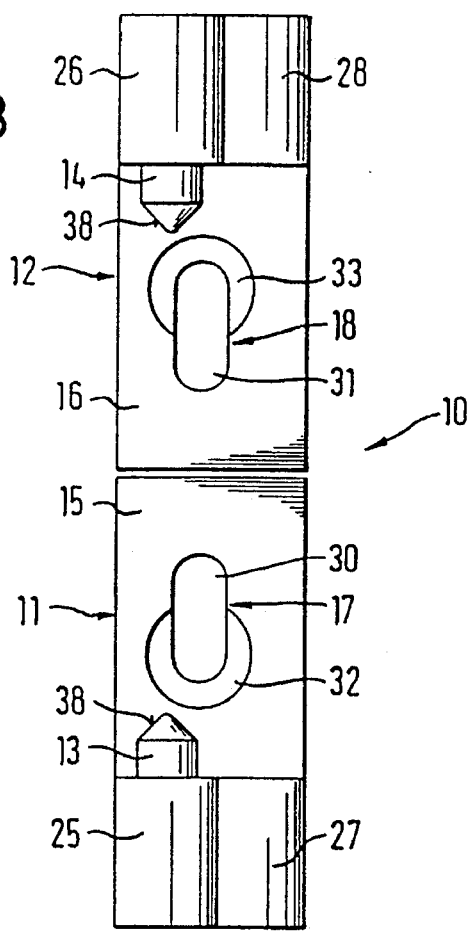

FIG. 3 a diagrammatic view of the door hinge according to FIG. 2 and in which the door-side hinge part is omitted to make understanding easier.

Figure 4:
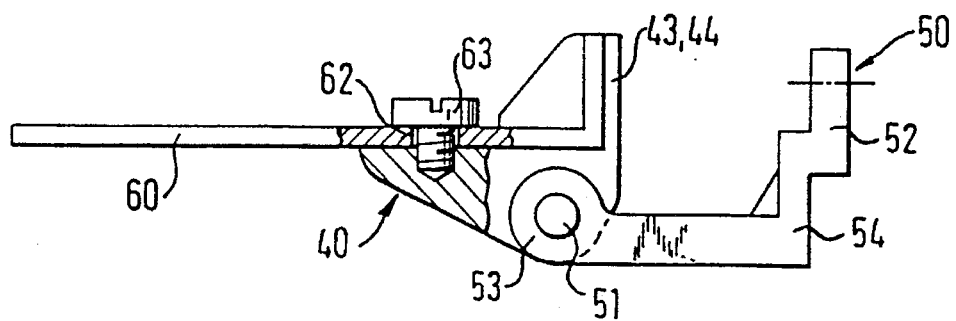

FIG. 4 a diagrammatic cross-section through a second embodiment of the door hinge according to the invention.

Figure 5:
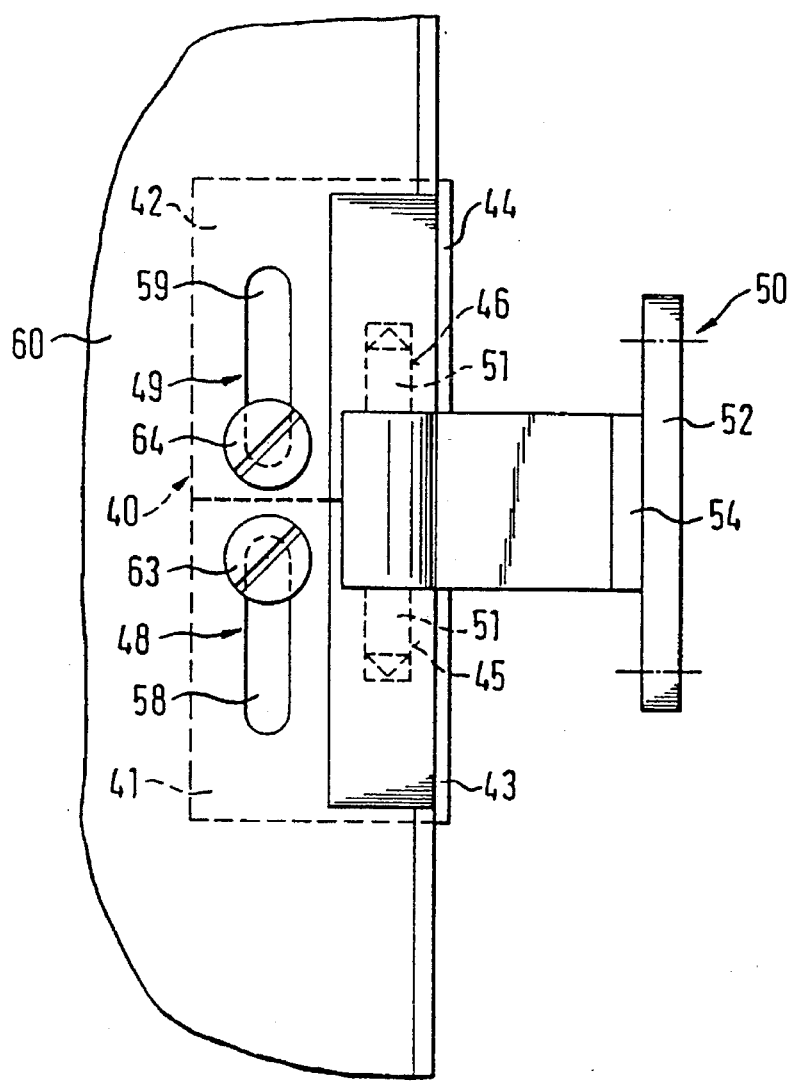

FIG. 5 a diagrammatic view of the door hinge according to FIG. 4.

Figure 6:
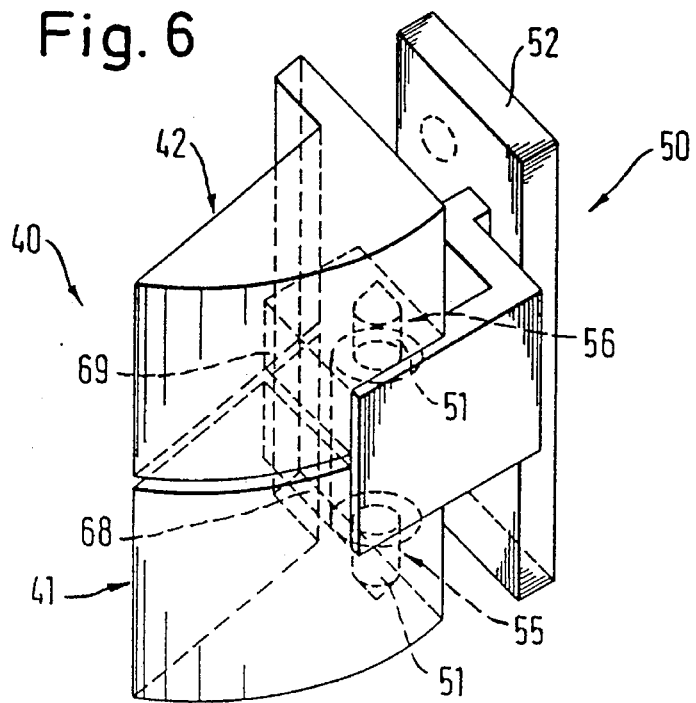

FIG. 6 a diagrammatic perspective view of the door hinge according to FIGS. 4 and 5.

FIG. 1 shows in detail form a hinge-side corner area of an equipment cabinet with a folding door 5 joined to a vertical beam 2 with the aid of a hinge 3. The door 5 has a seal 7 cooperating with a sealing web 9 on the vertical beam 2, as well as a hat section 6.

In this first embodiment the door hinge 3 comprises a door-side hinge part 20 fixed to the door 5 by a hinge band 22 and having a rolled in hinge hole 21, which for easier viewing purposes in FIG. 2 is positioned alongside a cabinet-side hinge part 10.

The cabinet-side hinge part 10 is constructed according to the invention and has an upper, cabinet-side hinge portion 12 with a hinge pin 14 and a lower, cabinet-side hinge portion 11 with a hinge pin 13.

As in general a door or window is joined by means of at least two hinges 3 to a cabinet or the like, on a front or rear vertical beam 2 of a cabinet or cabinet frame are to be fitted at least four cabinet-side hinge portions, namely two upper and two lower cabinet-side hinge portions 11,12.

For fastening the upper and lower cabinet-side hinge portions 11,12 is provided a mounting flange 15,16, which engages in plate-like manner on the vertical beam 2 and is provided with a fastening area 17,18. The fastening area 17 of the lower, cabinet-side hinge portion and the fastening area 18 of the homologously constructed and positioned, upper cabinet-side hinge portion 12 has an elongated hole 30,31, as well as a depression 32,33 for receiving a countersunk screw 34 used for fastening the hinge portions 11,12. The length of the elongated holes 30,31, their spacing from the associated hinge pin 13,14 or the pin-remote end of the mounting flanges 15,16 are matched to one another and in the case of a maximum travel x permit a sliding apart of the cabinet-side hinge portions 11,12 in such a way that the door-side hinge part 20 or the hinge hole 21 passes out of the engagement area of the hinge pins 13,14, so that the cabinet door 5 can be removed. It is also possible to arrange in fixed manner the lower, cabinet-side hinge part 11 and only upwardly move the upper, cabinet-side hinge portion 12 over a correspondingly longer travel path, so that the door-side hinge part 20 or the hinge hole 21 can be removed from the lower hinge portion 11. This vertical adjustment of one or both cabinet-side hinge portions 11,12 only requires a loosening of the countersunk screw or screws 34. A complete release or removal of the hinge portions 11,12 is unnecessary.

FIG. 1 shows the advantageous fastening of the upper or lower cabinet-side hinge portion in a bore 24 of a slot outside 28 of the vertical beam 2. The lockable spring nut 8 is preferably inserted and held in the square T-slot 29.

Alternatively to the shown adjustability of the cabinet-side hinge portion or portions 11,12, a vertical adjustment can also be provided by means of an elongated hole construction in the vertical beam 2, i.e. in the slot outside 28. In this case there is no need to form elongated holes and it is sufficient to have a normal countersunk screw bore in the mounting flanges 15,16 of the cabinet-side hinge portions 11,12.

FIG. 2 shows the press fit of the hinge pin 13 in a sleeve-like receptacle 25 and the construction of the lower hinge pin support 27. The upper, cabinet-side hinge portion 12 is constructed and arranged homologously to the lower hinge portion 11. Therefore the upper hinge pin 14 with the associated sleeve-like receptacle 26 and hinge pin support 28 are not shown, but can be gathered from FIG. 3. In the drawings identical reference numerals are used for identical features. The one-piece, door-side hinge part 20 is shown in the released position. The hinge band 22 with which the door-side hinge part 20 is fixed to the door 5 is merely intimated.

FIG. 3 is a diagrammatic view of the bipartite, homologous construction of the lower and upper hinge portions 11,12 of the cabinet-side hinge part 10. The fastening areas 17,18 are virtually centrally positioned and permit the vertical adjustment of one or both cabinet-side hinge portions 11,12. The hinge pins 13,14, which have frustum-like insertion areas 38, are aligned with one another and constructed outside the longitudinal axis of the cabinet-side hinge portions 11,12.

FIGS. 4 to 6 show a second construction of the hinge according to the invention. A hinge part, designated as a cabinet-side hinge part 50 fixable e.g. to a cabinet or a frame (not shown) by means of a mounting flange 52 is constructed in one piece. The cabinet-side hinge part 50 has an angular hinge support 54 and an almost cylindrical area 53 with hinge pins 51 projecting on either side.

The door-side hinge part 40 is in two portions and axially adjustable, so that the hinge portions 40,50 can be separated from one another and also a door change from right to left stop are possible without difficulty and can in particular be carried out by one person. The door-side upper and lower hinge portions 41,42 have in this embodiment in each case one reception area 55,56 with bearing holes 45,46 for the hinge pins 51 of the cabinet-side hinge part 50. Moreover, both in the lower and in the upper door-side hinge portion 41,42 is formed a fastening area 48,49 with an elongated hole 58,59 for the axial adjustment and fixing of the two door-side hinge portions 41,42. Alternatively to this construction the door 60 can be provided in corresponding areas with an elongated hole 62. For fixing the assembled hinge a fastening element 63, e.g. a screw, cooperates with a screw thread in the lower or upper door-side hinge portion 41,42.

The door-side, lower and upper hinge portion 41,42 also has a guidance area 43,44, which projects virtually at right angles from the reception areas 55,56 and engages on a door edge. When the door 60 is closed the hinge support 54 of the cabinet-side hinge part 50 is aligned with the reception areas 55,56 of the lower and upper, door-side hinge portion 41,42, whereas the virtually cylindrical area 53 is received in recesses 68,69 of the lower and upper, door-side hinge portion 41,42.

A hinge with a bipartite hinge part 40 mountable on an outside of a door 60 and a one-piece, cabinet-side hinge part 50 is consequently able to meet the functional, manufacturing and esthetic requirements.

I claim:

1. A door hinge for a door for switch and instrument cabinets comprising:

a door-side hinge part;

a cabinet-side hinge part; and at least one hinge pin providing rotary engagement between said door-side hinge part and said cabinet-side hinge part;

characterized in that at least one of said door-side hinge part and said cabinet-side hinge part is constructed from two portions defining a first hinge portion and a second hinge portion and in that the first and second hinge portions are constructed homologously and are axially and independently adjustable relative to one another for insertion and release of the other of said door-side hinge part and said cabinet-side hinge part.

2. A door hinge according to claim 1, characterized in that the cabinet-side hinge part is constructed from two portions and has a first, lower hinge portion and a second, upper hinge portion, a mounting flange with a fastening area is provided on each of the first, lower hinge portion and the second, upper hinge portion, and at least one fastening area is constructed for adjustable fixing of an associated one of said first, lower hinge portion and said second, upper hinge portion.

3. A door hinge according to claim 2, characterized in that the door-side hinge part is constructed in one piece and is positioned between the first, lower hinge portion and the second, upper hinge portion, and further comprising hinge pins, projecting from opposite sides of the door-side hinge part, engaging in bearing holes defined in the first, lower hinge portion and the second, upper hinge portion.

4. A door hinge according to claim 2, characterized in that the door-side hinge part is constructed in one piece and is positioned between the first, lower hinge portion and the second, upper hinge portion and so that a lower hinge pin and an upper hinge pin, placed on the first, lower hinge portion and the second, upper hinge portion, engage in a hinge hole of the door-side hinge part.

5. A door hinge according to claim 4, characterized in that the first, lower hinge portion is constructed homologously to the second, upper, hinge portion and a travel path between the mounting flange provided on the first, lower hinge portion and the mounting flange provided on the second, upper hinge portion is at least as great as that of a hinge pin length of at least one of the lower hinge pin and the upper hinge pin which is insertable in the hinge hole of the door-side hinge port.

6. A door hinge according to claim 4, characterized in that each of the lower hinge pin and the upper hinge pin is firmly received in a sleeve-like receptacle held on the mounting flange by a hinge pin support.

7. A door hinge according to claim 4, characterized in that the first, lower hinge portion and the second, upper hinge portion are fixed to a vertical beam, the door-side hinge part can be mounted on the lower hinge pin and the second, upper hinge portion, with the hinge pin inserted in the hinge hole, is adjustable relative to said first, lower hinge portion.

8. A door hinge according to claim 7, and further comprising a lockable spring nut, characterized in that the cabinet-side hinge parts are to be fixed in a T-slot, defined in the vertical beam, by the lockable spring nut.

9. A door hinge according to claim 7, characterized in that the second, upper hinge portion is lockable in position.

10. A door hinge according to claim 4, characterized in that in the fastening area of at least one of the first, lower hinge portion and the second, upper hinge portion is formed an elongated hole and a depression for receiving a countersunk screw, an axial length of the elongated hole being determined by a necessary travel path for releasing the door-side hinge part.

11. A door hinge according to claim 4, characterized in that the first, lower hinge portion and the second, upper hinge portion are fixed to a vertical beam, the door-side hinge part can be mounted on the lower hinge pin and the second, upper hinge portion, is lockable in position with the hinge pin inserted in the hinge hole.

12. A door hinge according to claim 1, characterized in that said door-side hinge part has a first door-side hinge portion and a second door-side hinge portion and in that at least one of said first door-side hinge portion and said second door-side hinge portion is axially adjustable for receiving and releasing a cabinet-side hinge part.

13. A door hinge according to claim 12, characterized in that the first door-side hinge portion is a lower, door-side hinge portion which is constructed homologously to the second door-side hinge portion and that the first door-side hinge portion and the second door-side hinge portion are provided with lower and upper hinge pins for insertion in a hinge hole formed in said cabinet-side hinge part.

14. A door hinge according to claim 12, characterized in that the first door-side hinge portion is a lower, door-side hinge portion which is constructed homologously to the second door-side hinge portion and that the first door-side hinge portion and the second door-side hinge portion have reception areas with bearing holes for receiving hinge pins projecting from opposite sides of the cabinet-side hinge part.

15. A door hinge according to claim 14, characterized in that at least one of the first door-side hinge portion and the second door-side hinge portion has a fastening area for at least one of axial adjustment and fixing of the at least one of the door-side hinge portions and at least one guide flange is constructed virtually at right angles to each fastening area and engages around a door edge for a random door stop.

16. A door hinge according to claim 15, characterized in that each fastening area has an elongated hole for receiving a fastening element, said elongated hole is formed in one of the door and at least one of the first door-side hinge portion and the second door-side hinge portion, and the elongated hole has a length which corresponds to a travel path for releasing and inserting the cabinet-side hinge part.

17. A door hinge according to claim 14, characterized in that the cabinet-side hinge part is provided with (1) a mounting flange fixable on a cabinet part, (2) an angular hinge support, and (3) a virtually cylindrical area, the virtually cylindrical area being received by recesses of the first door-side hinge portion and the second door-side hinge portion.

18. A door hinge according to claim 14, characterized in that the cabinet-side hinge parts are constructed as aluminum die castings and each of the hinge pins is provided with a frustum-like insertion area.

* * * * *